US012597762B2

(12) United States Patent
Opalach et al.

(10) Patent No.: US 12,597,762 B2
(45) Date of Patent: Apr. 7, 2026

(54) CABLE RETAINER ASSEMBLIES AND CABLE ENCLOSURES

(71) Applicant: Preformed Line Products Company, Mayfield, OH (US)

(72) Inventors: Kevin M. Opalach, Macedonia, OH (US); Jacob Palmer, Chesterland, OH (US)

(73) Assignee: Preformed Line Products Company, Cleveland, OH (US)

( * ) Notice: Subject to any disclaimer, the term of this patent is extended or adjusted under 35 U.S.C. 154(b) by 275 days.

(21) Appl. No.: 18/526,119

(22) Filed: Dec. 1, 2023

(65) Prior Publication Data

US 2025/0183633 A1 Jun. 5, 2025

(51) Int. Cl.
*H02G 3/04* (2006.01)
(52) U.S. Cl.
CPC ................................. *H02G 3/0406* (2013.01)
(58) Field of Classification Search
CPC .................................................. H02G 3/0406
USPC ......................................................... 174/135
See application file for complete search history.

(56) References Cited

U.S. PATENT DOCUMENTS 6,892,990 B2 * 5/2005 Pisczak ................... H02G 7/053
248/62
8,882,066 B2 * 11/2014 Otten ........................ F16L 1/24
248/230.8

9,780,548 B1 * 10/2017 Kranz ................. G02B 6/44785
12,176,698 B2 * 12/2024 Nunez ........................ F16L 3/22
2002/0088644 A1 * 7/2002 Burland .............. B60R 16/0207
174/135
2013/0139359 A1 6/2013 Otten et al.
2015/0310964 A1 10/2015 Larson et al.
2020/0403390 A1 * 12/2020 Jette ........................ H02S 40/30
2021/0257749 A1 8/2021 Newman

FOREIGN PATENT DOCUMENTS

WO 2019243779 A1 12/2019

OTHER PUBLICATIONS

Patent Cooperation Treaty (PCT), International Search Report and Written Opinion for PCT/US2024/058142 filed on Application filed Dec. 2, 2024, mailed Mar. 28, 2025, International Searching Authority, US.

* cited by examiner

*Primary Examiner* — Timothy J Thompson
*Assistant Examiner* — Michael F Mcallister
(74) *Attorney, Agent, or Firm* — McDonald Hopkins LLC

(57) ABSTRACT

A cable retainer assembly includes a housing defining a plurality of recesses and a plurality of enclosures configured to be received by the plurality of the recesses. Each of the plurality of enclosures includes at least one retaining member having a body extending from a distal end to a proximal end, and a plurality of inner slots and a plurality of outer slots formed within the body. Each of the plurality of outer slots have a first profile that accommodate a first plurality of cables having a first type and the plurality of inner slots have a second profile different from the first profile of the plurality of outer slots. The plurality of inner slots accommodate a second plurality of cables having a second type different from the first type of the first plurality of cables.

20 Claims, 8 Drawing Sheets

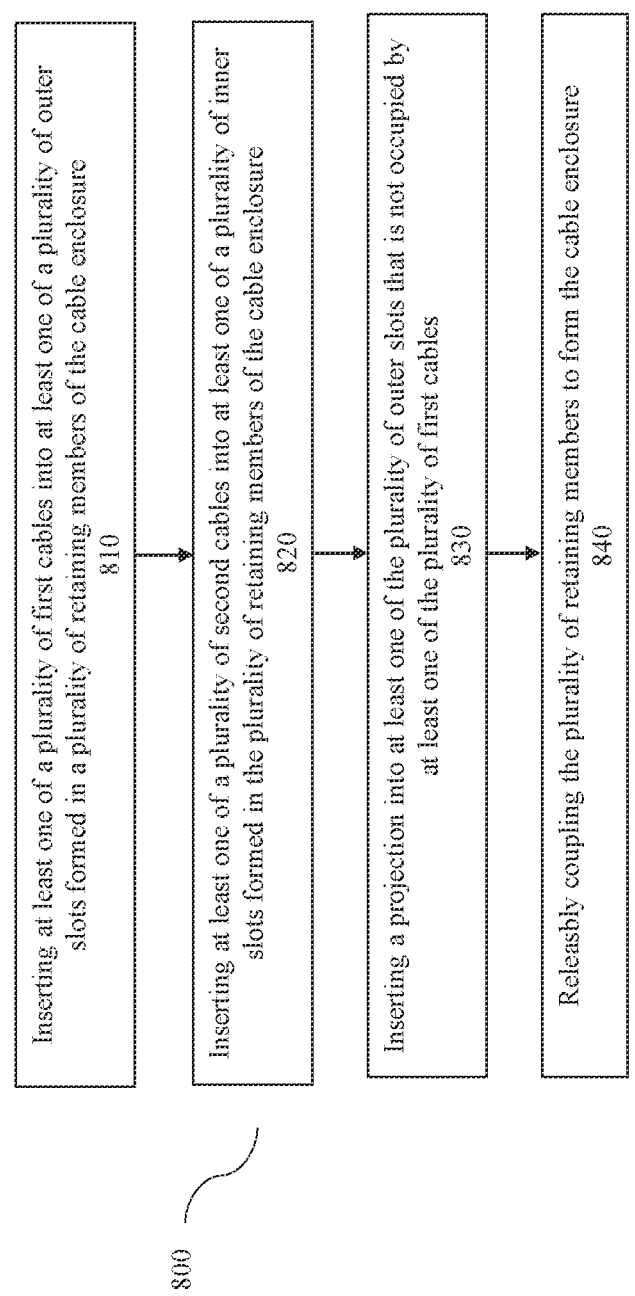

Inserting at least one of a plurality of first cables into at least one of a plurality of outer slots formed in a plurality of retaining members of the cable enclosure
810

Inserting at least one of a plurality of second cables into at least one of a plurality of inner slots formed in the plurality of retaining members of the cable enclosure
820

Inserting a projection into at least one of the plurality of outer slots that is not occupied by at least one of the plurality of first cables
830

Releasbly coupling the plurality of retaining members to form the cable enclosure
840

CABLE RETAINER ASSEMBLIES AND CABLE ENCLOSURES

TECHNICAL FIELD

The present specification generally relates to cable retainer assemblies, and more specifically, to cable enclosures configured to accommodate cables of varying shapes and/or sizes.

BACKGROUND

Traditional cable retainer assemblies often suffer from limited flexibility and capacity. Furthermore, conventional methods of managing cables typically involve the use of fixed-size enclosures and/or the tedious process of drilling new holes in poles or structures to add additional self-supporting cables. These approaches are not only labor-intensive, but also lack the adaptability needed to handle various types of cables, particularly when space is at a premium or when aesthetic and structural considerations are paramount. Furthermore, the traditional assemblies struggle to manage cables having thin jackets, as these cables may not be securely held in place by standard fixtures due to their propensity to slip and/or become dislodged. Accordingly, a need exists for a cable retainer assembly that provides enhanced adaptability to accommodate a variety of cables having differing sizes and/or profiles.

SUMMARY

In an embodiment, a cable retainer assembly is disclosed. The cable retainer assembly includes a housing defining a plurality of recesses and a plurality of enclosures configured to be received by the plurality of recesses, with each of the plurality of enclosures including at least a first retaining member and a second retaining member. The first retaining member and second retaining member each include a body extending from a distal end to a proximal end, a plurality of inner slots formed within the body, the plurality of inner slots extending from the distal end of the body to the proximal end of the body, and a plurality of outer slots formed within the body and positioned adjacent each of the plurality of inner slots, the plurality of outer slots extending from the distal end of the body to the proximal end of the body. Each of the plurality of outer slots have a first profile configured to accommodate a first plurality of cables having a first type and the plurality of inner slots have a second profile different from the first profile of the plurality of outer slots. The plurality of inner slots are further configured to accommodate a second plurality of cables having a second type different from the first type of the first plurality of cables.

In another embodiment, a cable enclosure is disclosed. The cable enclosure includes at least a first retaining member and a second retaining member. The first retaining member and second retaining member each include a body extending from a distal end to a proximal end, a plurality of inner slots formed within the body, the plurality of inner slots extending from the distal end of the body to the proximal end of the body, and a plurality of outer slots formed within the body and positioned adjacent each of the plurality of inner slots, the plurality of outer slots extending from the distal end of the body to the proximal end of the body. Each of the plurality of outer slots have a first profile configured to accommodate a first plurality of cables having a first type and the plurality of inner slots have a second profile different from the first profile of the plurality of outer slots. The plurality of inner slots are further configured to accommodate a second plurality of cables having a second type different from the first type of the first plurality of cables.

In yet another embodiment, a method of securing a cable within a cable enclosure is disclosed. The method includes inserting at least one of a plurality of first cables into at least one of a plurality of outer slots formed in a plurality of retaining members of the cable enclosure; inserting at least one of a plurality of second cables into at least one of a plurality of inner slots formed in the plurality of retaining members of the cable enclosure, the at least one of the first plurality of cables having a first size that is greater than a second size of the at least one of the second plurality of cables; inserting a projection into at least one of the plurality of outer slots that is not occupied by at least one of the plurality of first cables; and releasbly coupling the plurality of retaining members to form the cable enclosure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 depicts an illustrative flow diagram of a method of securing a cable within a cable retainer assembly, according to one or more embodiments shown and described herein.

DETAILED DESCRIPTION

Figure 1:
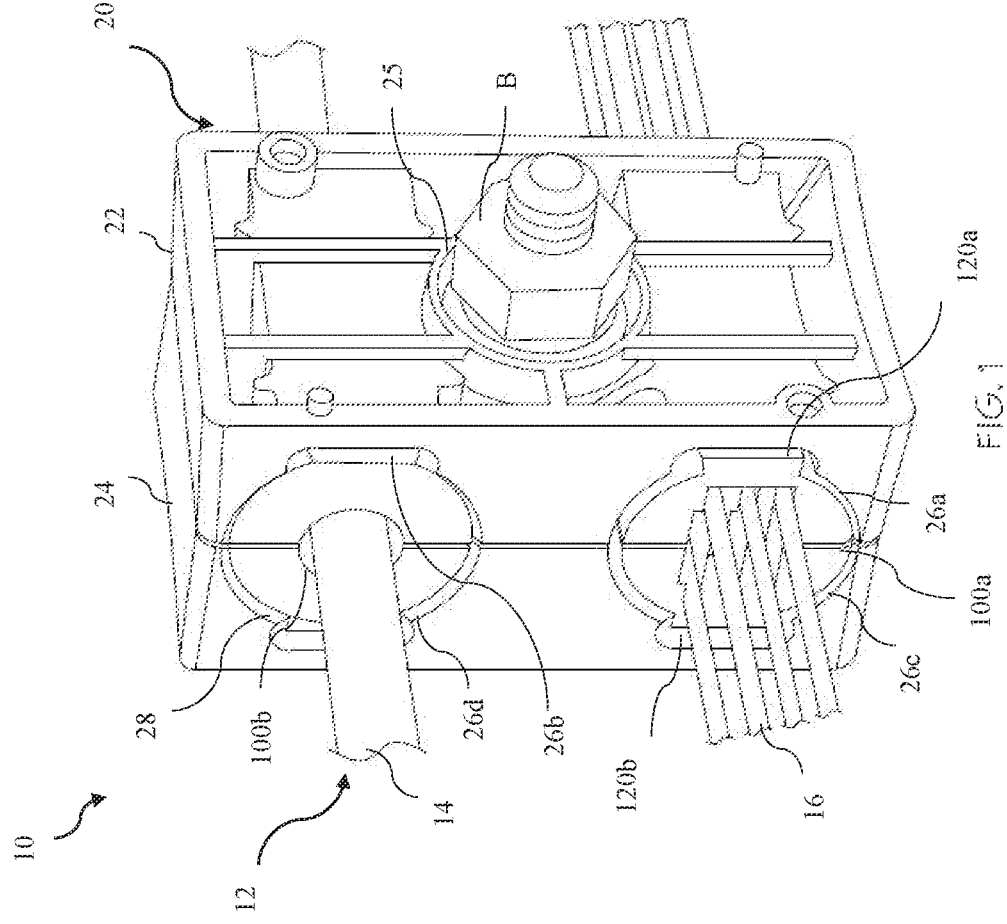
FIG. 1 depicts a perspective view of a cable retainer assembly, according to one or more embodiments shown and described herein.

Embodiments disclosed herein relate to cable retainer assembly, cable enclosures, and methods of securing cables. More specifically, the present disclosure relates to a cable retainer assembly including a housing defining a plurality of recesses, and a plurality of enclosures configured to be received by the plurality of the recesses. In the embodiments described herein, each of the plurality of enclosures may include at least a first retaining member and a second retaining member. Each of the retaining members may include a body extending from a distal end to a proximal end, and a plurality of inner slots and a plurality of outer slots formed within the body. Each of the plurality of outer slots may have a first profile configured to accommodate a first plurality of cables having a first type, while the plurality of inner slots may have a second profile different from the first profile of the plurality of outer slots. Accordingly, the plurality of outer slots may be configured to accommodate a second plurality of cables having a second type different from the first type of the first plurality of cables. By utilizing a variety of slots having different sizes within a cable enclosure, it may be possible to secure a variety of cables having differing sizes, diameters, and/or gauges within a single cable retainer assembly, thereby increasing the adaptability of the assembly.

As should be appreciated, traditional cable retainer assemblies suffer from limited flexibility and capacity. Accordingly, in the absence of a versatile cable retainer system, the installation of additional cables in traditional assemblies may lead to clutter, increased maintenance cost, and the risk of cable damage. Furthermore, the rigidity of traditional cable retainer assemblies also pose a significant challenge when adapting to cables that vary in diameter, such as flat cables and outer circular and/or oval-shaped fiber optic cable, which are becoming increasingly common in modern infrastructure.

The disclosed cable retainer assembly addresses these deficiencies by introducing an assembly that includes a housing capable of accommodating multiple cable enclosures which are each configured to hold and secure cables of different sizes and/or profiles. The modular design of the cable enclosures, comprising two separable portions, allows for easy insertion and removal of cables. This feature is particularly beneficial for managing the installation and organization of modern drop cables, which require more delicate handling due to their thin jackets. The enclosures are designed to securely house each cable, protecting them from physical strain and environmental exposure.

Furthermore, by providing a housing that can hold multiple enclosures of varying sizes, the disclosed cable retainer assembly offers a scalable solution that can be customized to the number and types of cables required for a particular application. The modular enclosures can be easily secured within the housing after the cables are inserted, streamlining the installation process and reducing the need for additional structural modifications or the use of separate fixtures for different cable types.

Accordingly, it should be appreciated that the disclosed cable retainer assembly offers a significant improvement in the management of telecommunications and utility cables by providing a flexible, secure, and cost-effective solution that addresses the limitations of existing cable retainer systems.

Embodiments of cable retainer assemblies, cable enclosures, and methods of securing cables will now be described in additional detail herein. The following will now describe these cable retainer assemblies, cable enclosures, and methods in more detail with reference to the drawings and where like numbers refer to like structures.

Referring now to FIG. 1, a cable retainer assembly 10 for securing a plurality of cables 12 is depicted. In the embodiments described herein, the plurality of cables 12 may include fiber optic drop cables, coaxial drop cables, or any other similar telecommunication cables. Furthermore, the plurality of cables 12 may include a first plurality of cables 14 and a second plurality of cables 16, with the first plurality of cables 14 being of a first type (e.g. having a first size and/or shape) and the second plurality of cables 16 being of a second type (e.g., having a second size and/or shape different from the first type of the first plurality of cables 14.) For example, in some embodiments, the first plurality of cables 14 may include a flat drop cable having a first size, while the second plurality of cables 16 may include drop cables having a second size different from the first size of the first plurality of cables 14. As will be described herein, the disclosed cable retainer assembly 10 may be configured for securing a plurality of cables 12 having various types (e.g.,. shapes, sizes, and/or gauges) within a single assembly, which may enhance the adaptability of the of the cable retainer assembly 10 while alleviating the need for multiple cable management systems configured to retain cables of a particular type (e.g., size and/or shape).

Referring still to FIG. 1, the cable retainer assembly 10 may including a housing 20 having a first portion 22 and a second portion 24, with the first portion 22 and the second portion 24 being releasably coupled. For example, as depicted in FIG. 1, the first portion 22 and the second portion 24 of the housing 20 may each include a central opening 25 extending through the first portion 22 and the second portion 24. In these embodiments, a bolt B, or any other similar attachment mechanism, may extend through the central opening 25 formed in each of the first portion 22 and the second portion 24 of the housing 20 to releasably couple the first portion 22 to the second portion 24.

Referring still to FIG. 1, the first portion 22 and the second portion 24 of the housing 20 may each define a plurality of recesses 26. For example, the first portion 22 may define a first recess 26a and a second recess 26b, while the second portion 24 defines a third recess 26c and a fourth recess 26d. In these embodiments, when the first portion 22 and the second portion 24 are coupled, the plurality of recesses 26 define a plurality of cavities 28, which are configured to receive a plurality of cable enclosures 100.

As further depicted in FIG. 1, the plurality of cable enclosures 100 may each include a plurality of retaining members 120, which may be configured to support a plurality of cables of varying shapes, sizes, and/or gauges. For example, as depicted in FIG. 1, the plurality of cable enclosures 100 may include a first cable enclosure 100a and a second cable enclosure 100b, with each of the first cable enclosure 100a and the second cable enclosure 100b including a first retaining member 120a and a second retaining member 120b. In these embodiments, the first retaining member 120a and the second retaining member 120b of each of the plurality of cable enclosures 100 may be configured to be received within at least one of the plurality of recesses 26 formed within the first portion 22 and the second portion 24 of the housing 20, respectively. For example, as depicted in FIG. 1, the first retaining member 120a of the first cable enclosure 100a may be received within the first recess 26*a* defined by the first portion 22 of the housing 20, and the second retaining member 120*b* of the first retaining member 120*a* of the first cable enclosure 100*a* may be received within the third recess 26*c* defined by the second portion 24 of the housing 20. Similarly, the first retaining member 120*a* of the second cable enclosure 100*b* may be received within the second recess 26*b* defined by the first portion 22 of the housing 20, and the second retaining member 120*b* of the second cable enclosure 100*b* may be received within the fourth recess 26*d* defined by the second portion 24 of the housing 20.

In operation, the plurality of cables 12 may be secured within the first and second retaining members 120*a*, 120*b* of each of the plurality of cable enclosures 100. Once the plurality of cables 12 are secured, the first and second retaining members 120*a*, 120*b* may be inserted into the plurality of recesses 26 formed within the first portion 22 and second portion 24 of the housing 20. With the plurality of cables 12 secured within the first and second retaining members 120*a*, 120*b* and the retaining members 120*a*, 120*b* positioned within their respective recesses, the first portion 22 and the second portion 24 of the housing 20 may be coupled together, as is depicted in FIG. 1.

Although the housing 20 of FIG. 1 is depicted as including a first portion 22 and a second portion 24, it should be appreciated that the housing 20 may include any number of portions without departing from the scope of the present disclosure. Furthermore, in some embodiments, the housing 20 may be formed as a single monolithic structure, with the first portion 22 and the second portion 24 being coupled via a hinge (or any other similar coupling mechanism) such that the first portion 22 and the second portion 24 may open relative one another to receive the plurality of cable enclosures 100. Similarly, it should be appreciated that the portions of the housing 20 may define any number of recesses 26 without departing from the scope of the present disclosure. For example, although the first portion 22 and the second portion 24 are each depicted as defining two recesses 26 (e.g., to accommodate two cable enclosures 100), the portions of the housing 20 may include any number of recesses 26 as may be necessary to accommodate a desired number of cable enclosures 100 (e.g., three enclosures, four enclosure, five enclosures, or any other number of enclosures).

Furthermore, it should be appreciated that the plurality of recesses 26 defined by the housing 20 may vary in size. For example, although FIG. 1 depicts each of the plurality of recesses 26 being the same size, each of the plurality of recesses 26 may have differing sizes, such that the plurality of cavities 28 defined by the plurality of recesses 26 may be configured to receive cable enclosures 100 having differing sizes. In these embodiments, the size of each of the plurality of cable enclosures 100 may be determined based on the size, shape, and/or gauge of the plurality of cables 12 secured within each of the plurality of cable enclosures 100.

Referring still to FIG. 1, it should be further noted that the cable enclosures 100 may be formed of any number of retaining members 120 (e.g., three, four, five retaining members, etc.) without departing from the scope of the present disclosure. In these embodiments, the cable enclosures 100 may also be formed of a single, monolithic structure, such that each of the plurality of retaining members 120 are fixedly attached to one another. For example, in the embodiments described herein, each of the plurality of retaining members 120 may be hingedly coupled such that the cable enclosure 100 may be opened to receive the plurality of cables 12 and closed to secure the plurality of cables 12 within the cable enclosure 100. The plurality of cable enclosures 100 will be described in additional detail herein with reference to FIGS. 2A-7.

Figures 2A, 2B:
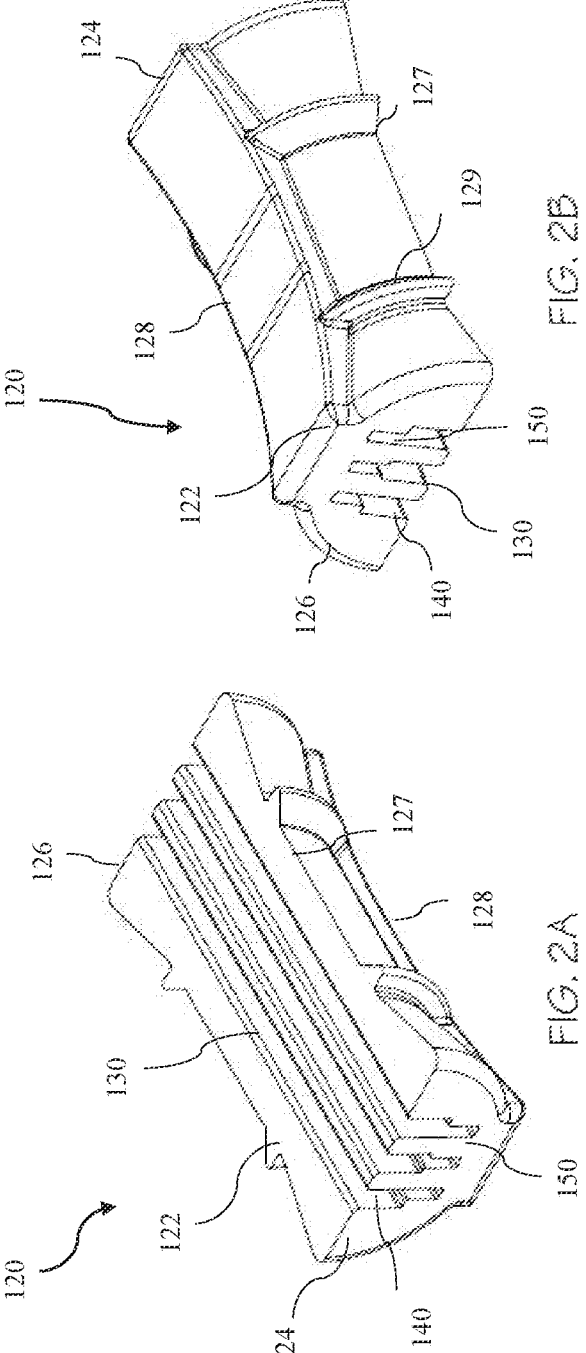
FIG. 2A depicts a top-side perspective view of a retaining member of an enclosure of the cable retainer assembly of FIG. 1, according to one or more embodiments shown and described herein.
FIG. 2B depicts a bottom-side perspective view of the retaining member of FIG. 2A, according to one or more embodiments shown and described herein.

Turning now to FIGS. 2A and 2B, an exemplary retaining member 120 of a cable enclosure 100 is depicted. In these embodiments, the retaining member 120 may include a body 122 that extends from a proximal end 124 of the retaining member 120 to a distal end 126 of the retaining member 120. As further depicted in FIGS. 2A and 2B, the body 122 may further include a top surface 127 and a bottom surface 128, with the bottom surface 128 including a plurality of ribs 129. For example, as depicted most clearly in FIG. 2B, the plurality of ribs 129 may include at least one rib extending along a length of the body 122 of the retaining member 120 (e.g., from the proximal end 124 to the distal end 126 of the retaining member 120) and at least one rib extending along a width of the body (e.g., from the top surface 127 to the bottom surface 128 of the retaining member 120). In these embodiments, the plurality of ribs 129 formed on the bottom surface 128 of the retaining member 120 may be configured to engage the plurality of recesses 26 formed in each portion of the housing 20, as will be described in additional detail herein with reference to FIG. 7.

Referring still to FIGS. 2A and 2B, the retaining member 120 may further include a plurality of slots 130 that extend through the body 122 of the retaining member 120 from the proximal end 124 to the distal end 126 of the retaining member 120. In these embodiments, the plurality of slots 130 may further be formed in the top surface 127 of the body 122 of the retaining member 120 and extend downwardly (e.g., in the −y-direction as depicted in the coordinate axes of FIGS. 2A and 2B) towards the bottom surface 128 of the retaining member 120.

As further depicted in FIGS. 2A and 2B, each of the plurality of slots 130 may include a plurality of outer slots 140 and a plurality of inner slots 150. In these embodiments, the plurality of outer slots 140 may be formed within the top surface 127 of the body 122 of the retaining member 120, while the plurality of inner slots 150 may be formed adjacent the plurality of outer slots 140 and extending beneath (e.g., in the −y-direction as depicted in the coordinate axes of FIGS. 2A and 2B) each of the plurality of outer slots 140. For example, each of the plurality of outer slots 140 may be laterally aligned (e.g., in the +/−y-direction as depicted in the coordinate axes of FIGS. 2A and 2B) with each of the plurality of inner slots 150, such that the plurality of outer slots 140 may be positioned above (e.g., in the +y-direction as depicted in the coordinate axes of FIGS. 2A and 2B) the plurality of inner slots 150.

In these embodiments, the plurality of outer slots 140 may have a first profile, while the plurality of inner slots 150 may have a second profile different from the first profile of the plurality of outer slots 140. As provided herein, the term "profile" may refer to the size and/or shape of each of the plurality of slots. Accordingly, it should be appreciated that the first profile of the plurality of outer slots 140 may have a size and/or shape that is different from the second profile of the plurality of inner slots 150. By configuring the plurality of outer slots 140 to have a first profile that is different from the second profile of the plurality of inner slots 150, it may be possible to accommodate cables of various sizes, shapes, and/or gauges in the various plurality of slots 130, as will be described in additional detail herein with reference to FIGS. 3-6.

Figure 3:
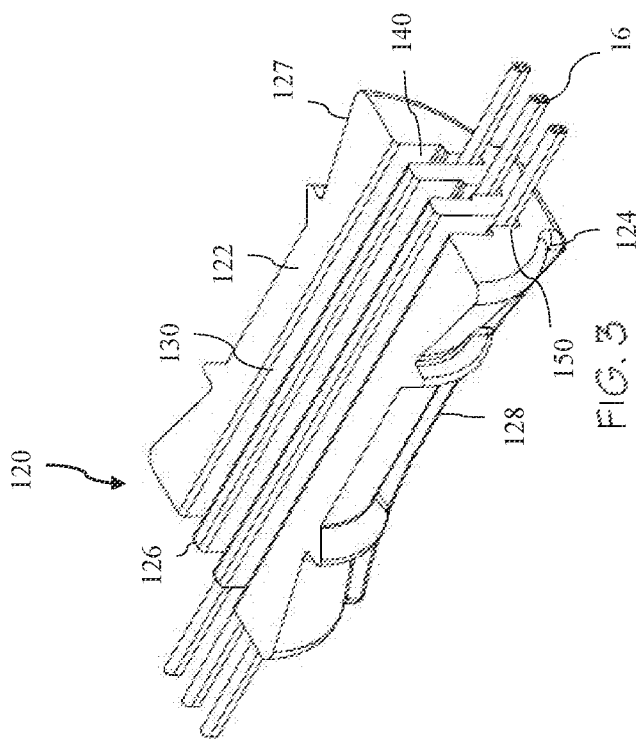
FIG. 3 depicts a top-side perspective view of the retaining member of FIGS. 2A and 2B securing a cable, according to one or more embodiments shown and described herein.

For example, with reference now to FIGS. 1-3, the first plurality of cables 14 of the first type may be secured within the plurality of outer slots 140, while the second plurality of cables 16 of the second type may be secured within the plurality of inner slots 150. In these embodiments, the first plurality of cables 14 may have a first cable size (e.g., width, diameter, etc.) that is larger than an inner slot size of the plurality of inner slots 150. Accordingly, when the first plurality of cables 14 are inserted within the plurality of slots 130 formed on the retaining member 120, the plurality of cables 14 may be received within the plurality of outer slots 140 without passing into the plurality of inner slots 150. In contrast, and as depicted most clearly in FIG. 3, the second plurality of cables 16 may have a second cable size (e.g., width, diameter, etc.) that is less than an outer slot size of the plurality of outer slots 140. Accordingly, when the second plurality of cables 16 are inserted into the plurality of slots 130 formed on the retaining member 120, the second plurality of cables are able to pass through the plurality of outer slots 140 and be inserted within the plurality of inner slots 150.

Figure 4B:
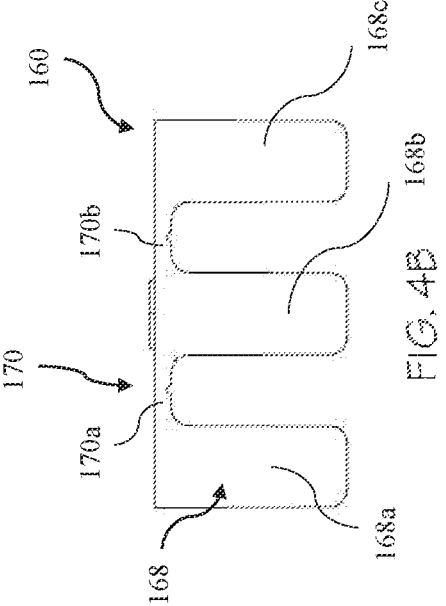
FIG. 4B depicts a front-side view of the insert of FIG. 4A, according to one or more embodiments shown and described herein.
Figure 4A:
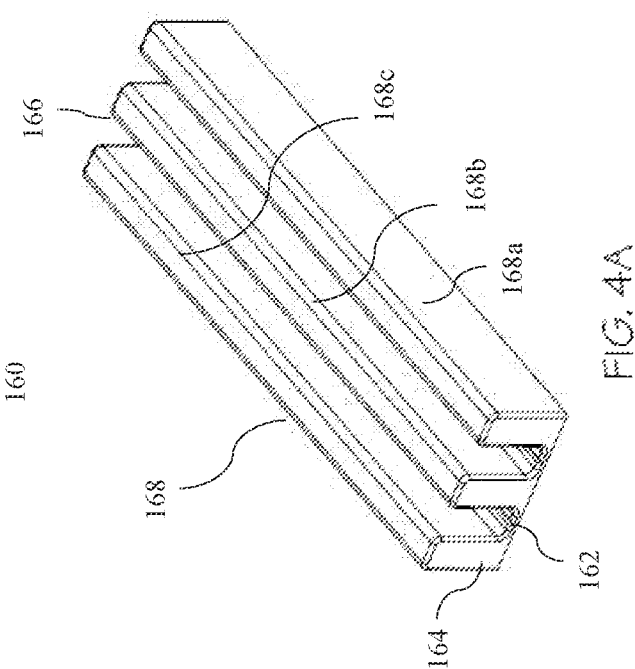
FIG. 4A depicts a top-side perspective view of an insert of the cable retainer assembly of FIG. 1, according to one or more embodiments shown and described herein.

Referring now to FIGS. 4A and 4B, the cable enclosure 100 may further include a plurality of inserts 160, such that each retaining member 120 utilized within the cable enclosure 100 is associated with at least one of the plurality of inserts 160. As depicted most clearly in FIG. 4A, each of the plurality of inserts 160 may include a base 162 extending between a first end 164 and a second end 166. In these embodiments, each of the plurality of inserts 160 may further include a plurality of projections 168 extending from the base 162 (e.g., in the +y-direction as depicted in the coordinate axes of FIGS. 4A and 4B).

In the embodiments described herein, each of the plurality of projections 168 is configured to be separable (e.g., detachable) from the base 162. For example, as further depicted in FIG. 4B, each of the plurality of inserts 160 may further include a plurality of junctions 170, with at least one of the plurality of junctions 170 being positioned between each of the plurality of projections 168. In these embodiments, the plurality of junctions 170 may be pre-scored (e.g., such that the junctions 170 are capable of separation) and/or formed of a material weaker than that of the base 162, such that each of the plurality of projections 168 may be separated from the base 162 by manually exerting a force on each of the plurality of junctions 170.

For example, as depicted in FIGS. 4A and 4B, the plurality of projections 168 may include a first projection 168a, a second projection 168b, and a third projection 168c. In these embodiments, the plurality of junctions 170 may include a first junction 170a disposed between the first projection 168a and the second projection 168b, and a second junction 170b disposed between the second projection 168b and the third projection 168c. As has been described herein, applying a force to the first junction 170a may cause the first junction 170a to break, thereby separating the first projection 168a from the base 162 and the remaining projections. Similarly, applying a force to the second junction 170b may cause the second junctions 170b to break, thereby separating the third projection 168c from the base 162 and the remaining projections. Furthermore, it should be understood that applying a force to each of the plurality of junctions 170 may allow for each of the plurality of projections 168 to be separated.

Figure 5:
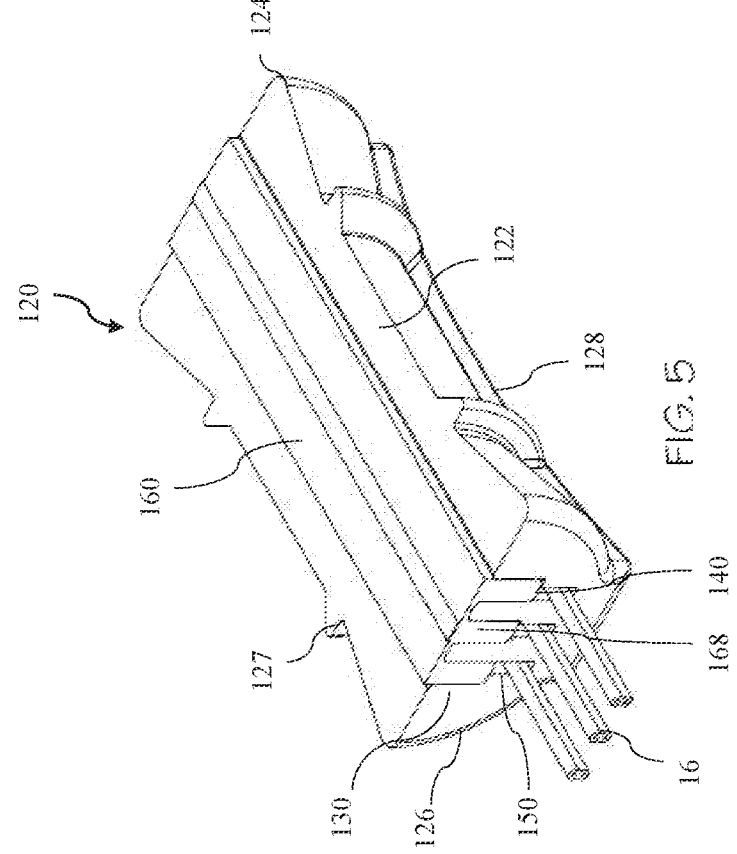
FIG. 5 depicts a top-side perspective view of the insert of FIGS. 4A and 4B inserted into the retaining member of FIGS. 2A and 2B, according to one or more embodiments shown and described herein.

In the embodiments described herein, the insert 160 may be inserted within the plurality of slots 130 to secure the plurality of cables 12 within the plurality of slots 130, as is depicted in FIG. 5. For example, as described hereinabove, the second plurality of cables 16 may have a second cable size that is smaller than the outer slot size of the plurality of outer slots 140. Accordingly, when the second plurality of cables 16 are inserted within the plurality of slots 130, the insert 160 may be placed within the retaining member 120 such that the plurality of projections 168 of the insert 160 extend into and occupy the space of the plurality of outer slots 140. By utilizing the insert 160 to fill the spaced within the plurality of outer slots 140, it may be possible to ensure that the second plurality of cables 16 remain secured within the plurality of inner slots 150.

Referring still to FIG. 5, the insert 160 may have an insert length that is equal to a length of the retaining member 120 (e.g., between the distal end and the proximal end of the body of the retaining member). Accordingly, when the insert 160 is positioned within the retaining member 120 (e.g., such that the plurality of projections 168 extend into the plurality of outer slots 140), each of the plurality of projections 168 may similarly extend along the length of the retaining member 120 to ensure that the cables disposed within the retaining member 120 remain secure.

Figure 6:
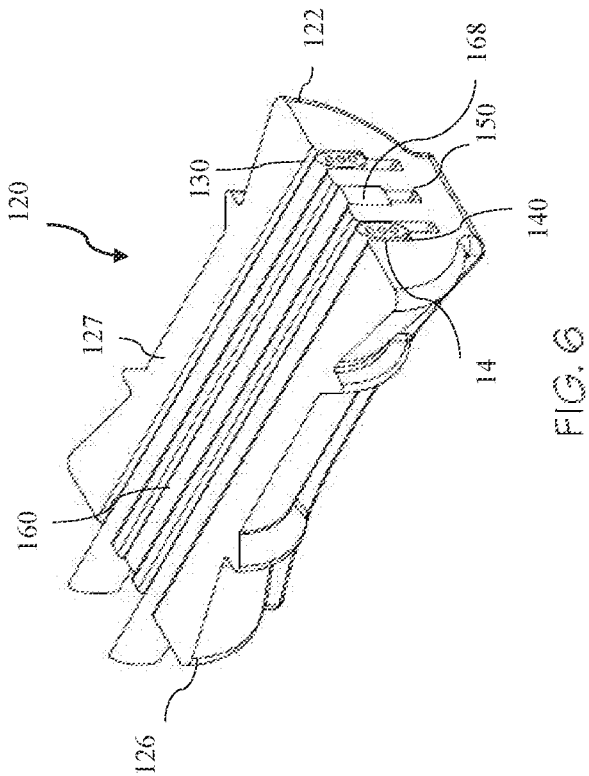
FIG. 6 depicts a top-side perspective view of another embodiment of the retaining member of FIGS. 2A and 2B, according to one or more embodiments shown and described herein.

Although FIG. 5 depicts each of the plurality of projections 168 of the insert 160 being disposed within the retaining member 120, it should be appreciated that the plurality of projections 168 may only be positioned in the plurality of outer slots 140 that are vacant. For example, as depicted in FIG. 6, the plurality of projections 168 of the insert 160 may be separated (e.g., by applying a force to the plurality of junctions 170, as described herein with reference to FIGS. 4A and 4B), and individual projections of the plurality of projections 168 may be inserted into the plurality of outer slots 140 that are not securing any of the plurality of cables 12. In these embodiments, the plurality of projections 168 may be inserted in one of the plurality of slots 130 that does not include any of the plurality of cables 12, and/or any of the plurality of slots 130 that have received the second plurality of cables 16 in at least one of the plurality of inner slots 150. Accordingly, it should be appreciated that each of the plurality of slots 130 may be occupied by either at least one of the first plurality of cables 14, at least one of the plurality of projections 168, or a combination of at least one of the second plurality of cables 16 and at least one of the plurality of projections 168.

Figure 7:
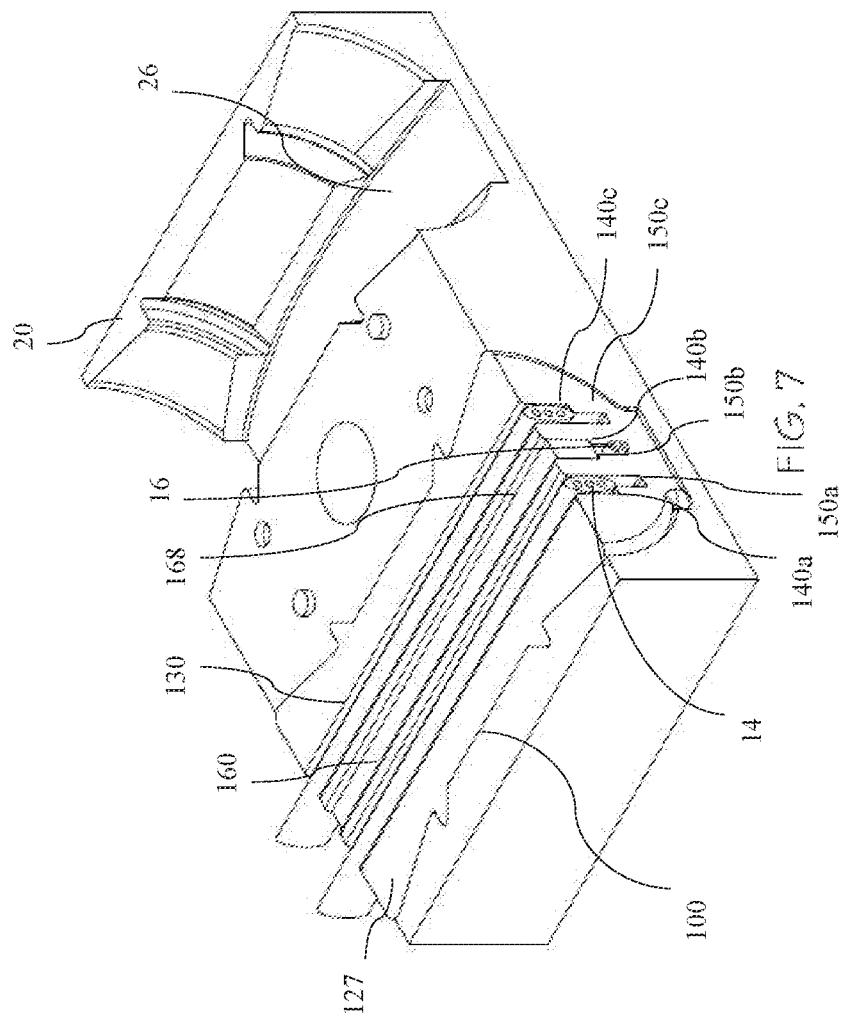
FIG. 7 depicts a top-side perspective view of the retaining member disposed in a housing of the cable retainer assembly of FIG. 1, according to one or more embodiments shown and described herein.

Referring now to FIG. 7, the retaining member 120 is depicted within a recess 26 of the housing 20 and is shown securing at least one cable from each of the first plurality of cables 14 and the second plurality of cables 16. For example, as depicted in FIG. 7, the plurality of slots 130 of the retaining member 120 may include a first outer slot 140a, a first inner slot 150a, a second outer slot 140b, a second inner slot 150b, a third outer slot 140c, and a third inner slot 150c. In these embodiments, the first outer slot 140a and the third outer slot 140c may each include a cable from the first plurality of cables 14, while the second inner slot 150b receives a cable from the second plurality of cables 16. As described herein, and to secure the cable within the second inner slot 150b, an insert 160 having a single projection 168 may be inserted within the second outer slot 140b.

Referring now to FIGS. 1-7 collectively, operation of the cable retainer assembly 10 will now be described in additional detail. In the embodiments described herein, the plurality of cables 12 may be inserted into the plurality of retaining members 120. For example, as has been described herein, a desired quantity of the first plurality of cables 14 may be inserted within the plurality of outer slots 140 formed in each of the plurality of retaining members 120, while a desired number of the second plurality of cables 16 may be inserted within the plurality of inner slots 150 formed in each of the plurality of retaining members 120.

Once the desired cables have been inserted into the corresponding slots, the plurality of inserts 160 may be inserted within the plurality of outer slots 140 formed in each of the retaining members 120 that are not occupied by any of the plurality of cables. With the cables and inserts secured within the plurality of retaining members 120, the plurality of retaining members 120 may be coupled together to form the plurality of cable enclosures 100. In the embodiments depicted in FIGS. 1-7, it should be appreciated that each of the plurality of cable enclosures 100 may include two of the retaining members 120, such that each of the plurality of cable enclosures 100 is configured to six total cables. For example, the plurality of retaining members 120 are each depicted as including three slots (e.g., each slot including an outer slot and an inner slot), such that three cables (e.g., of either the first plurality of cables 14 or second plurality of cables 16) may be secured within each of the retaining members 120. Accordingly, when the retaining members 120 are coupled to form the cable enclosures 100, each cable enclosure 100 may include up to six cables.

Although the cable enclosures 100 are depicted as including six cables, it should be appreciated that the cable enclosures 100 may include any number of cables without departing from the scope of the present disclosure. For example, the number of the plurality of slots 130 formed on the plurality of retaining members 120 may be adjusted based on the particular application of the cable enclosure 100. In these embodiments, each of the plurality of retaining members 120 may include two slots, four slots, five slots, six slots, or any other number of slots. Accordingly, the maximum number of cables that may be supported by each of the plurality of retaining members 120 may be equal to the number of the plurality of slots 130 formed in the plurality of retaining members 120. Similarly, the number of cables that may be secured within each cable enclosure 100 may be a product of the number of the plurality of retaining members 120 forming the cable enclosure 100. Finally, the number of cables that may be secured within the cable retainer assembly 10 may be a product of the number of cable enclosures 100 secured within the housing 20 of the cable retainer assembly 10.

Referring still to FIGS. 1-7, it should be understood that, once the plurality of retaining members 120 are coupled to one another, the top surface 127 of each of the plurality of retaining members 120 may contact one another to further secure the plurality of cables 12 within the cable enclosure 100. For example, as each of the plurality of outer slots 140 may receive either a projection 168 of the insert 160 or a cable of the first plurality of cables 12, the coupling of the plurality of retaining members 120 may result in a compressive force being applied on each of the plurality of cables 12 and the plurality of projections 168 of the insert 160 disposed within the cable enclosure 100. This compressive force may ensure that the plurality of cables 12 within the cable enclosure 100 remain secured following installation of the cable retainer assembly 10.

As further depicted in FIGS. 1-7 with the plurality of cables 12 secured within the plurality of cable enclosures 100, the cable enclosures 100 may be secured within the plurality of recesses 26 formed within the housing 20. As has been described herein, in these embodiments, the bottom surface 128 of each of the plurality of retaining members 120 include a plurality of ribs 129 that may engage the plurality of recesses 26 to secure the plurality of cable enclosures 100 within the plurality of recesses 26. With the plurality of cable enclosures 100 secured within the plurality of recesses 26, the portions of the housing 20 (e.g., first portion 22 and second portion 24) may be coupled together by inserting the bolt B through the central opening 25.

Turning now to FIG. 8, an illustrative flow diagram of a method of securing a cable within a cable enclosure is depicted.

As should be appreciated in view of the foregoing, the present disclosure relates to a cable retainer assembly including a housing defining a plurality of recesses, and a plurality of enclosures configured to be received by the plurality of the recesses. In the embodiments described herein, each of the plurality of enclosures may include at least a first retaining member and a second retaining member. Each of the retaining members may include a body extending from a distal end to a proximal end, and a plurality of inner slots and a plurality of outer slots formed within the body. Each of the plurality of outer slots may have a first profile configured to accommodate a first plurality of cables having a first type, while the plurality of inner slots may have a second profile different from the first profile of the plurality of outer slots. Accordingly, the plurality of outer slots may be configured to accommodate a second plurality of cables having a second type different from the first type of the first plurality of cables. By utilizing a variety of slots having different sizes within a cable enclosure, it may be possible to secure a variety of cables having differing sizes, diameters, and/or gauges within a single cable retainer assembly, thereby increasing the adaptability of the assembly.

Further aspects of the embodiments described herein are provided by the subject matter of the following clauses:

Clause 1. A cable retainer assembly comprising: a housing defining a plurality of recesses; and a plurality of enclosures configured to be received by the plurality of recesses, each of the plurality of enclosures including at least a first retaining member and a second retaining member, the first retaining member and second retaining member each comprising: a body extending from a distal end to a proximal end; a plurality of inner slots formed within the body, the plurality of inner slots extending from the distal end of the body to the proximal end of the body; and a plurality of outer slots formed within the body and positioned adjacent each of the plurality of inner slots, the plurality of outer slots extending from the distal end of the body to the proximal end of the body; wherein each of the plurality of outer slots have a first profile configured to accommodate a first plurality of cables having a first type and the plurality of inner slots have a second profile different from the first profile of the plurality of outer slots, the plurality of inner slots being further configured to accommodate a second plurality of cables having a second type different from the first type of the first plurality of cables.

Clause 2. The cable retainer assembly of clause 1, further comprising a plurality of inserts for coupling to the first retaining member and second retaining member.

Clause 3. The cable retainer assembly of clause 1 or 2, wherein the plurality of inserts further comprise a plurality of projections.

Clause 4. The cable retainer assembly of any of clauses 1-3, wherein the plurality of projections are configured to extend into each of the plurality of outer slots that are not occupied with the first plurality of cables.

Clause 5. The cable retainer assembly of any of clauses 1-4, wherein the plurality of inserts further comprise a plurality of junctions positioned between each of the plurality of projections, such that each of the plurality of projections may be separated by applying a force to each of the plurality of junctions.

Clause 6. The cable retainer assembly of any of clauses 1-5, wherein the body each of the first retaining member and the second retaining member further comprises a plurality of ribs for engaging the plurality of recesses defined by the housing.

Clause 7. The cable retainer assembly of any of clauses 1-6, wherein the plurality of outer slots have an outer slot width that is greater than an inner slot width of the plurality of inner slots.

Clause 8. The cable retainer assembly of any of clauses 1-7, wherein the first plurality of cables have a first cable size that is greater than a second cable size of the second plurality of cables.

Clause 9. The cable retainer assembly of any of clauses 1-8, wherein the housing further includes a first portion and second portion, each of the first portion and the second portion including a central opening.

Clause 10. The cable retainer assembly of any of clauses 1-9, wherein a bolt is extended through the central opening formed in each of the first portion and the second portion of the housing to secure the first portion to the second portion of the housing.

Clause 11. The cable retainer assembly of any of clauses 1-10, wherein the first retaining member and the second retaining member are formed as a single monolithic structure with a hinged coupling.

Clause 12. A cable enclosure comprising: at least a first retaining member and a second retaining member, the first retaining member and second retaining member each comprising: a body extending from a distal end to a proximal end; a plurality of inner slots formed within the body, the plurality of inner slots extending from the distal end of the body to the proximal end of the body; and a plurality of outer slots formed within the body and positioned adjacent each of the plurality of inner slots, the plurality of outer slots extending from the distal end of the body to the proximal end of the body; wherein each of the plurality of outer slots have a first profile configured to accommodate a first plurality of cables having a first shape and the plurality of inner slots have a second profile different from the first profile of the plurality of outer slots, the plurality of inner slots being further configured to accommodate a second plurality of cables having a second shape different from the first shape of the first plurality of cables.

Clause 13. The cable enclosure of clause 12, further comprising a plurality of inserts for coupling to the first retaining member and second retaining member.

Clause 14. The cable enclosure of clause 12 or 13, wherein the plurality of inserts further comprise a plurality of projections.

Clause 15. The cable enclosure of any of clauses 12-14, wherein the plurality of projections are configured to extend into each of the plurality of outer slots that are not occupied with the first plurality of cables.

Clause 16. The cable enclosure of any of clauses 12-15, wherein the plurality of inserts further comprise a plurality of junctions positioned between each of the plurality of projections, such that each of the plurality of projections may be separated by applying a force to each of the plurality of junctions.

Clause 17. The cable enclosure of any of clauses 12-16, wherein the plurality of outer slots have an outer slot width that is greater than an inner slot width of the plurality of inner slots.

Clause 18. The cable enclosure of any of clauses 12-17, wherein the first plurality of cables have a first cable size that is greater than a second cable size of the second plurality of cables.

Clause 19. A method of securing a cable within a cable enclosure of a cable retainer assembly, the method comprising: inserting at least one of a plurality of first cables into at least one of a plurality of outer slots formed in a plurality of retaining members of the cable enclosure; inserting at least one of a plurality of second cables into at least one of a plurality of inner slots formed in the plurality of retaining members of the cable enclosure, the at least one of the first plurality of cables having a first size that is greater than a second size of the at least one of the second plurality of cables; inserting a projection into at least one of the plurality of outer slots that is not occupied by at least one of the plurality of first cables; and releasbly coupling the plurality of retaining members to form the cable enclosure.

Clause 20. The method of clause 19, wherein inserting the projection into at least one of the plurality of outer slots further involves separating the projection from an insert by manually applying a force to a junction formed on the insert.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A cable retainer assembly comprising:
a housing defining a plurality of recesses; and
a plurality of enclosures configured to be received by the plurality of recesses, each of the plurality of enclosures including at least a first retaining member and a second retaining member, the first retaining member and second retaining member each comprising:
a body extending from a distal end to a proximal end;

a plurality of inner slots formed within the body, the plurality of inner slots extending from the distal end of the body to the proximal end of the body; and a plurality of outer slots formed within the body and positioned adjacent each of the plurality of inner slots, the plurality of outer slots extending from the distal end of the body to the proximal end of the body;

wherein each of the plurality of outer slots have a first profile configured to accommodate a first plurality of cables having a first type and the plurality of inner slots have a second profile different from the first profile of the plurality of outer slots, the plurality of inner slots being further configured to accommodate a second plurality of cables having a second type different from the first type of the first plurality of cables.

2. The cable retainer assembly of claim 1, further comprising a plurality of inserts for coupling to the first retaining member and second retaining member.

3. The cable retainer assembly of claim 2, wherein the plurality of inserts further comprise a plurality of projections.

4. The cable retainer assembly of claim 3, wherein the plurality of projections are configured to extend into each of the plurality of outer slots that are not occupied with the first plurality of cables.

5. The cable retainer assembly of claim 4, wherein the plurality of inserts further comprise a plurality of junctions positioned between each of the plurality of projections, such that each of the plurality of projections may be separated by applying a force to each of the plurality of junctions.

6. The cable retainer assembly of claim 1, wherein the body each of the first retaining member and the second retaining member further comprises a plurality of ribs for engaging the plurality of recesses defined by the housing.

7. The cable retainer assembly of claim 1, wherein the plurality of outer slots have an outer slot width that is greater than an inner slot width of the plurality of inner slots.

8. The cable retainer assembly of claim 1, wherein the first plurality of cables have a first cable size that is greater than a second cable size of the second plurality of cables.

9. The cable retainer assembly of claim 1, wherein the housing further includes a first portion and second portion, each of the first portion and the second portion including a central opening.

10. The cable retainer assembly of claim 9, wherein a bolt is extended through the central opening formed in each of the first portion and the second portion of the housing to secure the first portion to the second portion of the housing.

11. The cable retainer assembly of claim 1, wherein the first retaining member and the second retaining member are formed as a single monolithic structure with a hinged coupling.

12. A cable enclosure comprising:

at least a first retaining member and a second retaining member, the first retaining member and second retaining member each comprising:

a body extending from a distal end to a proximal end;

a plurality of inner slots formed within the body, the plurality of inner slots extending from the distal end of the body to the proximal end of the body; and a plurality of outer slots formed within the body and positioned adjacent each of the plurality of inner slots, the plurality of outer slots extending from the distal end of the body to the proximal end of the body;

wherein each of the plurality of outer slots have a first profile configured to accommodate a first plurality of cables having a first shape and the plurality of inner slots have a second profile different from the first profile of the plurality of outer slots, the plurality of inner slots being further configured to accommodate a second plurality of cables having a second shape different from the first shape of the first plurality of cables.

13. The cable enclosure of claim 12, further comprising a plurality of inserts for coupling to the first retaining member and second retaining member.

14. The cable enclosure of claim 13, wherein the plurality of inserts further comprise a plurality of projections.

15. The cable enclosure of claim 14, wherein the plurality of projections are configured to extend into each of the plurality of outer slots that are not occupied with the first plurality of cables.

16. The cable enclosure of claim 15, wherein the plurality of inserts further comprise a plurality of junctions positioned between each of the plurality of projections, such that each of the plurality of projections may be separated by applying a force to each of the plurality of junctions.

17. The cable enclosure of claim 12, wherein the plurality of outer slots have an outer slot width that is greater than an inner slot width of the plurality of inner slots.

18. The cable enclosure of claim 12, wherein the first plurality of cables have a first cable size that is greater than a second cable size of the second plurality of cables.

19. A method of securing a cable within a cable enclosure of a cable retainer assembly, the method comprising:

inserting at least one of a plurality of first cables into at least one of a plurality of outer slots formed in a plurality of retaining members of the cable enclosure;

inserting at least one of a plurality of second cables into at least one of a plurality of inner slots formed in the plurality of retaining members of the cable enclosure, the at least one of the first plurality of cables having a first size that is greater than a second size of the at least one of the second plurality of cables;

inserting a projection into at least one of the plurality of outer slots that is not occupied by at least one of the plurality of first cables; and releasably coupling the plurality of retaining members to form the cable enclosure.

20. The method of claim 19, wherein inserting the projection into at least one of the plurality of outer slots further involves separating the projection from an insert by manually applying a force to a junction formed on the insert.

* * * * *